Patented Jan. 13, 1931

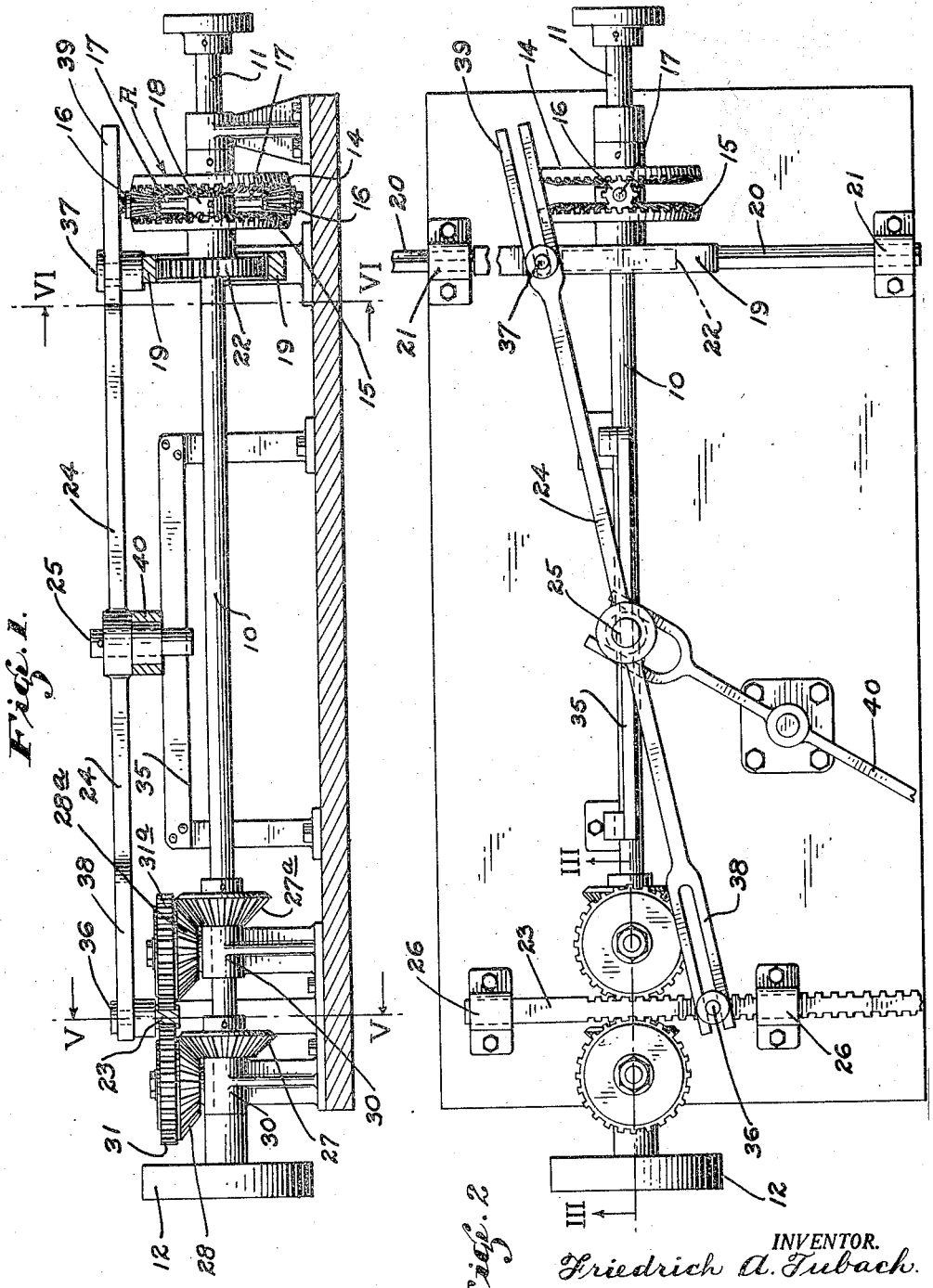

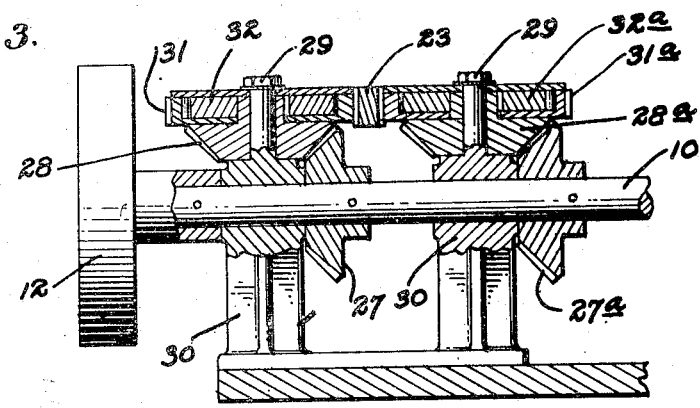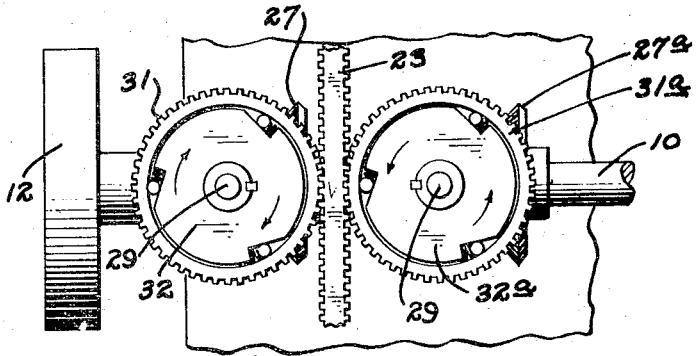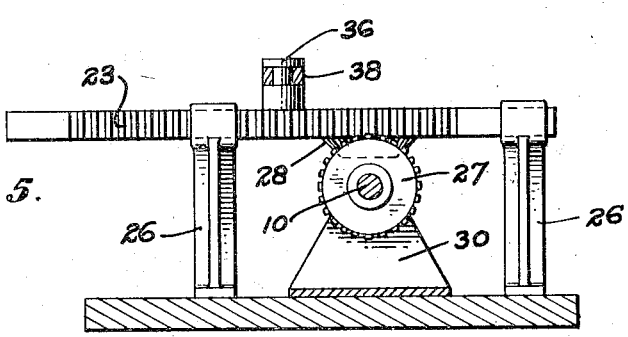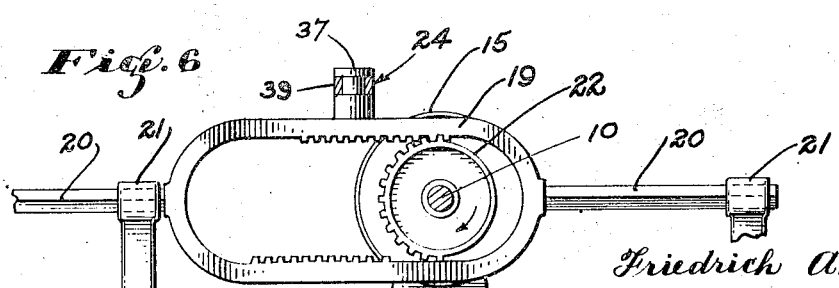

1,788,815

UNITED STATES PATENT OFFICE

FRIEDRICH A. TUBACH, OF SAN FRANCISCO, CALIFORNIA

VARIABLE-SPEED GEAR MECHANISM

Application filed March 19, 1930. Serial No. 437,076.

This invention relates to a variable speed gear transmission whereby power is transmitted from one shaft to a constant mesh gear transmission in which an infinite torque and speed ratio between neutral and a direct drive may be transmitted without the changing of gears.

Many types of variable speed power transmissions have been evolved, such as cone pulleys, friction discs and the like. Heretofore this type of device has been found impractical because of the loss of power through friction, the complicated mechanism involved, and the rapid wear and tear to which they are subjected.

The object of my invention is to provide a simple form of power transmission in which the ratio of transmission from one shaft to another may be varied infinitely between neutral and a direct drive through positively connected mechanical means.

I attain my object by the provision of a driving and driven shaft connected by a differential mechanism, the operation of which is controlled by a pair of reciprocal members, one of which is connected to the drive shaft and one to the differential and which are interconnected by an oscillatory lever. The fulcrum of the oscillatory lever is variable and through variation controls the operation of the differential. One form of my invention is shown by way of illustration in the accompanying drawings.

In these drawings—

Fig. 1 is a side elevation with parts shown in section, of a transmission embodying the principle of my invention.

Fig. 2 is a plan view of the device shown in Fig. 1,

Fig. 3 is an enlarged section taken on the line III—III of Fig. 2,

Fig. 4 is a plan view of the parts shown in Fig. 3,

Fig. 5 is an enlarged section taken on the line V—V of Fig. 1, and

Fig. 6 is a section taken on the line VI—VI of Fig. 1.

Referring more particularly to the drawings, and especially to Fig. 1, I show a drive shaft 10 and a driven shaft 11. Means for connecting the drive shaft to a prime mover is illustrated by a pulley 12 secured to its end. The drive shaft 10 is engageable with the driven shaft 11 by means of the differential gearing generally indicated at A and comprising a bevel gear 14 secured to the driven shaft, a similar bevel gear 15 freely rotatable upon the drive shaft, and a pair of pinion gears 16—16 intermeshing with the two bevel gears. The pinion gears 16—16 are journaled upon a transverse shaft 17 carried by a hub 18 which is mounted on and secured against rotation with relation to the drive shaft 10.

Rotary motion imparted to the driven shaft 11 by the drive shaft 10 is inversely proportional to the speed of rotation of the bevel gear 15. By way of a concrete example, it is clear that if the bevel gear 15 is allowed to rotate freely upon the shaft 10 it will rotate at twice the speed of the hub 18 which carries the transverse shaft 17 and no motion will be imparted to the gear 14 or the driven shaft 11 to which it is secured as the pinions 16—16 will merely travel around the gear 14 and the gear 15 will be carried by or receive rotary motion from the pinions. On the other hand if the bevel gear 15 is held against rotating, the motion of the pinions 16—16 will impart rotary motion to the bevel gear 14. Assuming that the gear 15 is caused to rotate with exactly the same speed as the drive shaft 10 it is obvious that there would be no relative movement between the pinions 16—16 and the gear 15. The result would be that similar rotation, or a direct drive, would be imparted to the driven shaft 11.

When there is any load upon the shaft 11 it is of course the tendency of the freely rotatable gear 15 to travel at twice the speed of the shaft 10. By retarding the speed of this gear driving force is transmitted to the shaft 11. The speed of rotation of the shaft 11 may thus be governed by the speed with which the gear 15 is allowed to rotate. The rotary speed of the gear 15 is controlled in a manner to be described.

Referring to Figs. 1, 2 and 6, I show a double rack bar 19 reciprocally mounted by means of rods 20 in bearing 21. The double rack bar 19 is disposed at right angles to the drive shaft 10 and is adapted to receive reciprocal motion from the continuous rotary motion of a sector pinion 22 which is formed integrally with the bevel gear 15 and likewise rotatable with relation to the shaft 10.

The reciprocal motion of the double rack 19 imparts like motion to a rack bar 23 by means of a lever 24 pivotally supported by a pin 25. The rack bar 23 is reciprocally mounted in brackets 26. The speed of the rack bar 23 is maintained constant with relation to the drive shaft 10 by means of a set of hold-back gears.

The hold-back gearing which is best shown in Figs. 3 and 4 consists of a pair of bevel gears 27 and 27a secured to the shaft 10. These gears engage bevel gears 28 and 28a respectively which are journaled upon trunnions 29 extending from the bearings 30. The bevel gears 28 and 28a support ring gears 31 and 31a each of which are engaged by roller clutches 32 and 32a. The roller clutches are of standard design and are adapted to permit the ring gears to rotate freely in one direction with relation to the bevel gears and to be retarded by the bevel gears if they are rotated in the opposite direction. The ring gears 31 and 31a engage opposite sides of the rack 23.

The function of the hold back gearing described is best illustrated in Fig. 4 in which arrows designate the direction of the motion of the rack and gears. In this figure it may be seen that the rack is limited as to its speed by the ring gear 31a which through the roller clutch 32a and the bevel gears 28a and 27a is positively connected to the shaft 10. The ring gear 31 is merely idling as due to its direction of rotation it travels freely with relation to the clutch and bevel gears. The rack 23 as hereinbefore stated is reciprocated and when its direction of motion is reversed the direction of rotation of the ring gears 31 and 31a is likewise reversed with the result that the clutch 32a is released and the clutch 32 takes hold. In this manner the speed of the reciprocal motion of the rack 23 is at all times governed by the rotary speed of the shaft 10.

It should be understood that as the speed of the rack 23 is constant with relation to the shaft 10 and the rack 23 is connected to the double rack 19 which controls the rotation of the gear 15, the rotary speed of the gear 15 is thereby controlled.

The speed of the gear 15 controls the speed of the driven shaft 11 and also the ratio of torque transmitted thereto. The pin 25 about which the lever 24 oscillates is slidably mounted upon a guide 35 and the lever engages pins 36 and 37 on the rack bar 23 and the double rack 19 respectively by means of its bifurcated ends 38 and 39. The oscillatory stroke of the lever 24 at the end engaging the rack bar 23 is varied by altering the position of the pin 25 on the guide 35. A hand lever 40 is shown to illustrate one manner in which this may be accomplished.

In Fig. 2 the pin 25 is in its extreme right hand position showing the lever arm from the pin 25 to the pin 36 at its greatest length. The rack bar 23 in this figure would be allowed its maximum stroke and the gear 15 is allowed to rotate at the speed of the shaft 10, thereby imparting direct drive to the shaft 11. If the pin 25 is moved to the left the lever arm from 25 to 36 is shortened and the reciprocal stroke of rack bar 23 is likewise shortened. As the rack bar 23 moves with a constant rate of speed shortening of its stroke permits the double rack 19 at the opposite end of the lever to reciprocate more rapidly. As the speed of the double rack 19 increases, so will the speed of the gear 15 with which it is connected. When the pin 25 is moved so far to the left that the speed of the gear 15 is twice the speed of the shaft 10, no motion will be imparted to the driven shaft 11, or in other words, the transmission may be said to be in neutral.

It is clear from the foregoing that the degree of power and speed transmitted by the drive shaft to the driven shaft in the transmission described may be varied as desired by the positioning of the fulcrum of the lever operating between the differential gear and its hold-back mechanism.

While I have shown one form of my invention, it should be understood that various changes may be resorted to in the manufacture and arrangement of its several parts without departing from the scope of the invention as set forth in the appended claims.

Having thus described my invention, what I claim and desire to secure by Letters Patent is—

1. A device of the character described comprising a drive shaft, a driven shaft, a bevel gear secured to the driven shaft, a bevel gear freely rotatable upon the drive shaft, a transverse shaft secured with relation to the drive shaft, pinion gears carried by the transverse shaft and intermeshing with the first and second named bevel gears, a member adapted to be reciprocated by said second gear, a second reciprocal member connected to the drive shaft, and means connecting said reciprocal members for controlling the speed of rotation of said second named gear.

2. A device of the character described comprising a drive shaft, a driven shaft, a bevel gear secured to the driven shaft, a bevel gear freely rotatable upon the drive shaft, a transverse shaft secured with relation to the drive shaft, pinion gears carried by the transverse shaft and intermeshing with the first and second named bevel gears, a reciprocating member connected to said second bevel gear, a second reciprocating member connected to the drive shaft, a variable fulcrum lever connecting said reciprocating members, and means for varying the fulcrum of the lever to vary the rotary speed of the second named bevel gear.

3. A device of the character described comprising a drive shaft, a driven shaft, a bevel gear secured to the driven shaft, a bevel gear freely rotatable upon the drive shaft, a transverse shaft secured with relation to the drive shaft, pinion gears carried by the transverse shaft and intermeshing with the first and second named bevel gears, a reciprocating member connected to said second named bevel gear, a second reciprocating member connected to the drive shaft and adapted to reciprocate at a constant rate of speed with relation to the rotary speed of the drive shaft, a slidable lever connecting said reciprocating members, and means whereby sliding of said lever will vary the rotary speed of the said second bevel gear.

4. In a transmission mechanism of the character described, a pair of reciprocating members, one member being reciprocated at a constant speed and variable stroke and the other at a variable speed and a constant stroke, a pivoted lever connecting the reciprocating members whereby reciprocal movement of the constant speed reciprocating member is transmitted to the constant stroke reciprocating member, and means changing the fulcrum point of the pivoted lever to vary the stroke of the constant speed member and thereby vary the speed of the constant stroke reciprocal member.

5. In a transmission mechanism of the character described, a pair of reciprocating members, one member being reciprocated at a constant speed and variable stroke and the other at a variable speed and a constant stroke, a pivoted lever connecting the reciprocating members whereby reciprocal movement of the constant speed reciprocating member is transmitted to the constant stroke reciprocating member, means changing the fulcrum point of the pivoted lever to vary the stroke of the constant speed member and thereby vary the speed of the constant stroke reciprocal member, a drive shaft and a driven shaft, a variable speed transmission connecting the same, and a connection between the constant stroke reciprocating member and the variable speed transmission whereby the ratio of torque and speed transmitted from the drive shaft to the driven shaft may be varied.

FRIEDRICH A. TUBACH.